UNITED STATES PATENT OFFICE.

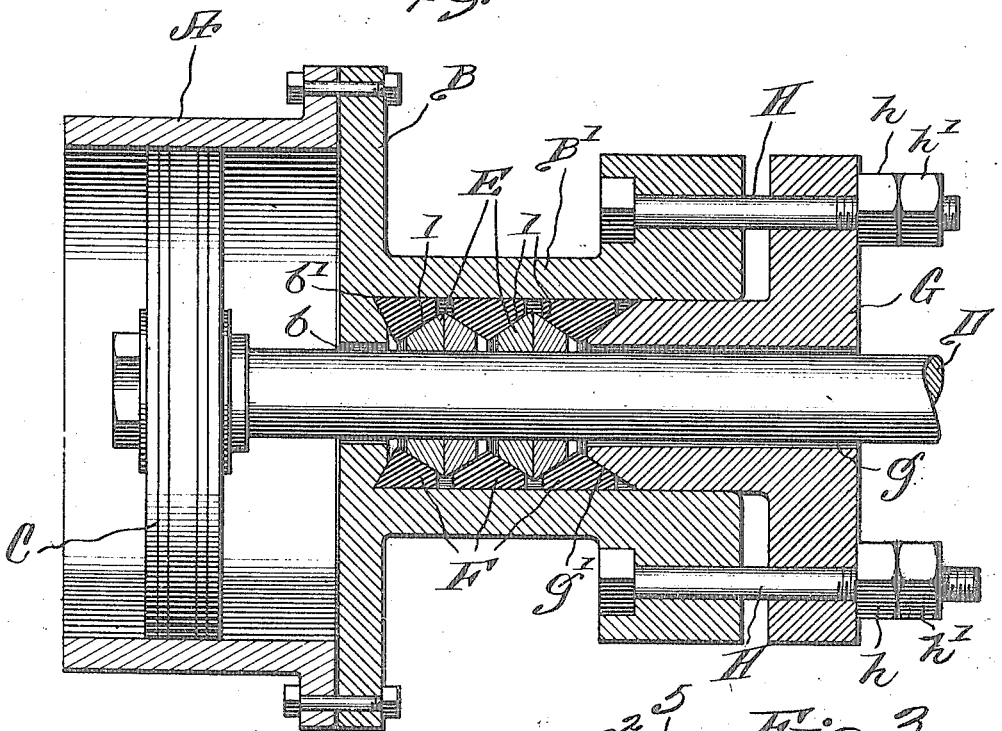
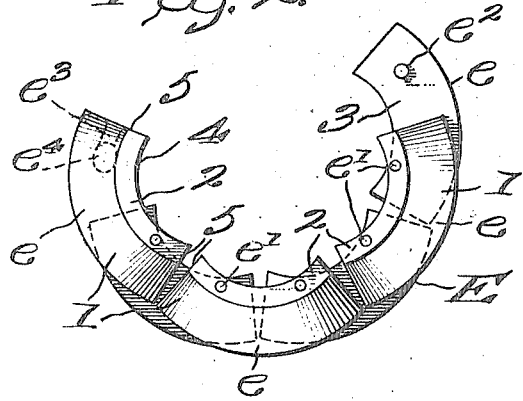
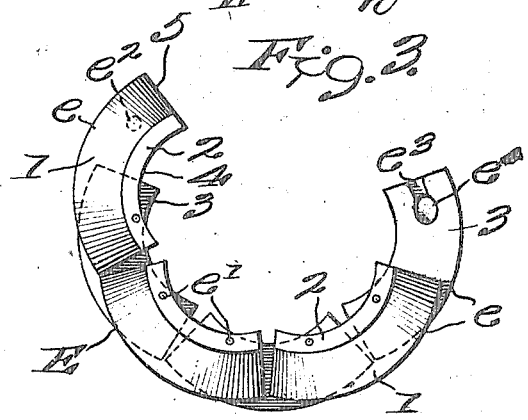
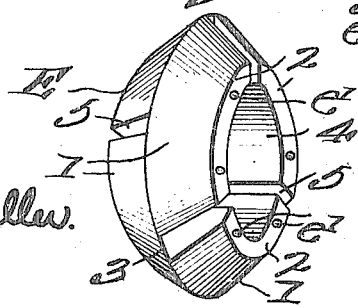
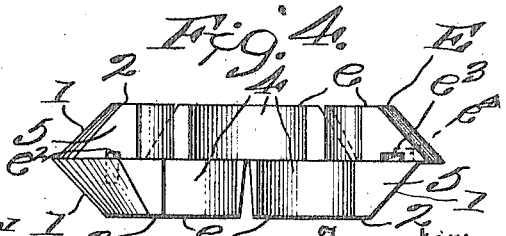

ALONZO CURTIS THROP AND JAMES CAMPBELL BATES, OF SHREVEPORT, LOUISIANA.

COMBINATION METAL AND FIBER PACKING FOR PISTON-RODS.

1,180,211.     Specification of Letters Patent.     Patented Apr. 18, 1916.

Application filed January 25, 1915. Serial No. 4,173.

*To all whom it may concern:*

Be it known that we, ALONZO C. THROP and JAMES C. BATES, citizens of the United States, residing at Shreveport, in the parish of Caddo and State of Louisiana, have invented a new and useful Combination Metal and Fiber Packing for Piston-Rods; and we do hereby declare the following to be a full, clear, and exact description of the invention, such as will enable others skilled in the art to which it appertains to make and use the same.

Our invention relates to improvements in packings for piston rods, or other reciprocating rods connected to pistons mounted in cylinders containing fluid under high pressure; and the invention consists in providing a series of metal packing rings, each composed of a plurality of parallel segments pivoted together axially, and each provided with cylindrical surfaces to engage the piston, the inner or abutting edges of the segments being plane so that said segments may be moved freely over each other.

The outer surfaces of the segments are reversely coned to engage and wedge outward suitable soft packing rings held in the stuffing box. Each segmental packing ring is provided with a loose detachable connection between the ends thereof, so that the ring may be attached to or removed from the piston rod as conveniently as a link bracelet may be applied to or removed from the wrist.

Our invention will be more fully understood by reference to the accompanying drawings, in which similar parts are indicated by similar reference symbols throughout the several views, and in which:—

Figure 1 shows a section through the end of the cylinder, cylinder head and stuffing box, the piston and piston rod being shown in elevation; Figs. 2 and 3 are detail views showing the segmental packing ring in the open position as seen from opposite sides thereof; Fig. 4 is a detail view showing the interior of the packing ring as spread open; and Fig. 5 is a detail view showing the metal packing ring in the closed position which it occupies when mounted on the piston rod.

A represents the cylinder having any suitable cylinder head B and stuffing box B'.

C represents the piston mounted in the cylinder, and D the piston rod passing freely through the opening $b$ in the cylinder head and the opening $g$ in the follower G.

Mounted in the stuffing box B' are the segmental metal packing rings E and the soft packing rings F, which latter may be made of fiber or any other suitable material well known in the art.

The follower is pressed home by bolts H and nuts $h$ and $h'$ in the usual way, and its nose may be provided with a conical surface $g'$, while the tapered groove $b'$ may be cut in the cylinder head if desired; but these features are not essential to the operation of the device.

The principal feature of the invention is the segmental metal packing ring shown in detail in Figs. 2–4, in which the ring E is composed of a plurality of segments $e$ connected together by pins $e'$ in the staggered relation, as shown most clearly in Figs. 2 and 3. These segments are superposed, as shown, and one of the end segments is provided with a lug or pin $e^2$ adapted to enter into the groove $e^3$ in the opposite end segment and to snap into the socket $e^4$, thus forming a substantially circular ring composed of two layers of segments connected together in the staggered relation, as shown.

Each individual segment $e$ is provided with a surface 1, which forms part of the surface of the frustum of a cone, and the top and bottom surfaces 2 and 3 are preferably plane and parallel, while the inner surface 4 is substantially cylindrical, and the end surfaces 5 are preferably plane, as shown.

The segments are assembled together to form substantially the frustums of two cones, having their bases in engagement, and with a cylindrical bore through the cone, which bore fits snugly over the piston rod.

To assemble the parts, suppose the follower to be removed and the stuffing box to be empty, except with the piston passing therethrough, insert, first, the soft packing ring, then mount one of the segmental metal rings on the piston rod and slip it into the stuffing box, then put in another soft packing ring, then put in another metal packing ring, and finally put in a third soft packing ring, mount the follower in place and screw up on the nuts $h$ until the packing is completed.

The pressure applied on the follower will cause the wedge faces 1 of the metal packing rings E to force the soft packing rings F outward, against the wall of the stuffing box, and a similar effect will be attained by the fluid pressure on the interior of the cylinder exerted through the opening $b$ in the cylinder head. The result will be that these segmental rings will be pressed firmly on the piston rods, and the joints in the metal packing rings being staggered, it will be impossible for the fluid pressure to escape past the packing and out through the opening $g$ in the follower G.

By having the socket $e^4$ elongated as shown, the segmental metal packing ring is adapted to fit itself automatically to the piston rod, and thus compensate for wear of the parts. When the ring is mounted in the stuffing box and held in engagement between the soft packing rings and the piston rod, it is not essential that the ends should be firmly secured together, but a little play of the ends is desired.

While we have shown in Fig. 1 two segmental metal packing rings and three soft packing rings, it will be obvious that the number of each may be increased or decreased as desired, dependent upon the conditions to be provided for.

While we have shown the pins $e'$ as passing through flat upper surfaces 2 of the segments $e$, it will be obvious that the ends of these pins may be countersunk in the outer tapering surface 1.

Having thus described our invention what we claim and desire to secure by Letters Patent of the United States is:—

1. A packing for piston rods, comprising a plurality of segmental metal packing rings, each composed of a double tier of segments pivoted together in the staggered relation, each segment having a conical outer face and a cylindrical inner face, with plane edges abutting radially, the whole constituting a ring substantially V-shaped in cross section, and a series of soft packing rings engaging the conical outer faces of said segmental metal rings and being compressed between same and the inner wall of the stuffing box, substantially as described.

2. A packing for piston rods, comprising a plurality of segmental metal packing rings, each composed of a double tier of segments pivoted together in the staggered relation, each segment having a conical outer face and a cylindrical inner face, with plane edges abutting radially, the whole constituting a ring substantially V-shaped in cross section, and a series of soft packing rings engaging the conical outer faces of said segmental metal rings, with a follower adapted to exert axial pressure on said rings, substantially as described.

3. A packing for piston rods, comprising a plurality of segmental metal packing rings, each composed of a double tier of segments pivoted together in the staggered relation, each segment having a conical outer face and a cylindrical inner face, with plane edges abutting radially, the whole constituting a ring substantially V-shaped in cross section, with means for detachably securing together the end segments of each segmental packing ring, whereby said ring may be opened or closed as desired, and a series of soft packing rings engaging the conical outer faces of said segmental metal rings and being compressed between same and the inner wall of the stuffing box, substantially as described.

4. A packing for piston rods, comprising a plurality of segmental metal packing rings, each composed of a double tier of segments pivoted together in the staggered relation, each segment having a conical outer face and a cylindrical inner face, with plane edges abutting radially, the whole constituting a ring substantially V-shaped in cross section, with means for detachably securing together the end segments of each segmental packing ring, whereby said ring may be opened or closed as desired, and a series of soft packing rings engaging the conical outer faces of said segmental metal rings, with a follower adapted to exert axial pressure on said rings, substantially as described.

5. As an article of manufacture, a metal packing ring adapted for use in piston packings, comprising a double tier of segments, said segments being pivoted together in the staggered relation, and each segment having a conical outer face and a cylindrical inner face, with plane edges abutting radially, the whole constituting a ring substantially V-shaped in cross section, substantially as described.

6. As an article of manufacture, a metal packing ring adapted for use in piston packings, comprising a double tier of segments, said segments being pivoted together in the staggered relation, and each segment having a conical outer face and a cylindrical inner face, with plane edges abutting radially, the whole constituting a ring substantially V-shaped in cross section, with means for detachably connecting together the two end segments whereby the ring may be completed or broken as desired, substantially as described.

In testimony whereof we have signed our names to this specification in the presence of two subscribing witnesses.

ALONZO CURTIS THROP.
JAMES CAMPBELL BATES.

Witnesses:
R. P. MOORE,
H. C. WALKER, Jr.